(12) United States Patent
Kurtz et al.

(10) Patent No.: US 7,874,216 B2
(45) Date of Patent: *Jan. 25, 2011

(54) MOUNTING APPARATUS AND METHOD FOR ACCURATELY POSITIONING AND ALIGNING A LEADLESS SEMICONDUCTOR CHIP ON AN ASSOCIATED HEADER

(75) Inventors: Anthony D. Kurtz, Saddle River, NJ (US); Alexander Ned, Kinnelon, NJ (US); Scott Goodman, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 42 days.

This patent is subject to a terminal disclaimer.

(21) Appl. No.: 12/288,363

(22) Filed: Oct. 20, 2008

(65) Prior Publication Data
US 2009/0313797 A1 Dec. 24, 2009

Related U.S. Application Data

(63) Continuation-in-part of application No. 12/214,507, filed on Jun. 19, 2008, now Pat. No. 7,673,518.

(51) Int. Cl.
*G01L 13/02* (2006.01)
(52) U.S. Cl. ........................................ 73/716; 257/414
(58) Field of Classification Search ........................ None
See application file for complete search history.

(56) References Cited

U.S. PATENT DOCUMENTS

| | | | | |
|---|---|---|---|---|
| 3,828,229 A * | 8/1974 | Anazawa | ..................... | 257/717 |
| 5,286,671 A * | 2/1994 | Kurtz et al. | .................... | 438/50 |
| 5,955,771 A * | 9/1999 | Kurtz et al. | ................. | 257/419 |
| 6,595,066 B1 * | 7/2003 | Kurtz et al. | .................... | 73/721 |
| 6,612,179 B1 * | 9/2003 | Kurtz | .......................... | 73/727 |
| 6,895,822 B2 * | 5/2005 | Kurtz et al. | .................... | 73/708 |
| 7,057,247 B2 * | 6/2006 | Kurtz et al. | ................. | 257/419 |
| 7,212,096 B2 * | 5/2007 | Kurtz et al. | .................... | 338/42 |
| 7,436,037 B2 * | 10/2008 | Kurtz et al. | ................. | 257/419 |
| 2009/0160069 A1 * | 6/2009 | Kurtz et al. | ................. | 257/778 |
| 2009/0260446 A1 * | 10/2009 | Kurtz et al. | .................... | 73/721 |
| 2009/0314094 A1 * | 12/2009 | Kurtz | .......................... | 73/721 |

\* cited by examiner

*Primary Examiner*—Andre J Allen
(74) *Attorney, Agent, or Firm*—James E. Schutz, Esq.; Dean Y. Shahriari; Troutman Sanders LLP

(57) ABSTRACT

There is disclosed a method and apparatus for mounting a leadless semiconductor chip on a header. The semiconductor chip has contacts on a surface and the chip is of a specified geometric shape. The header has a contact surface for receiving the chip with the contact surface of the header containing header contact pins, which pins have to contact the contacts on the semiconductor chip. The header has a guide pin extending from the contact surface and there is a guide plate which has an aperture adapted to be placed over the guide pin, the guide plate further has a chip accommodating aperture of the same geometric shape as the chip. The guide plate, when placed over the guide pin enables the chip to be placed in the chip accommodating aperture so that the contacts of the header pin are properly and accurately aligned with respect to the contacts on the semiconductor chip.

20 Claims, 3 Drawing Sheets

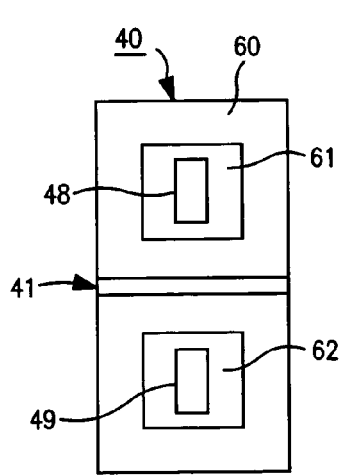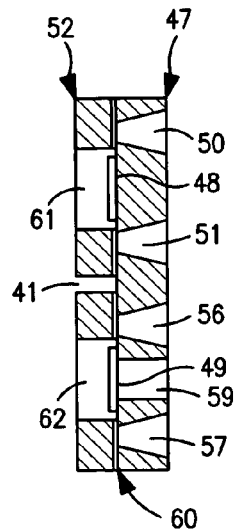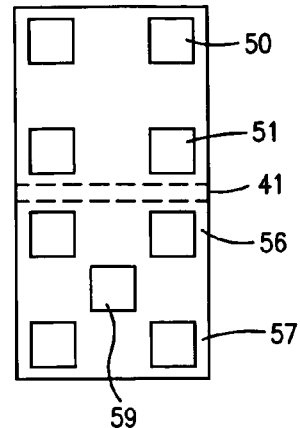
FIG. 1A  FIG. 1B  FIG. 1C
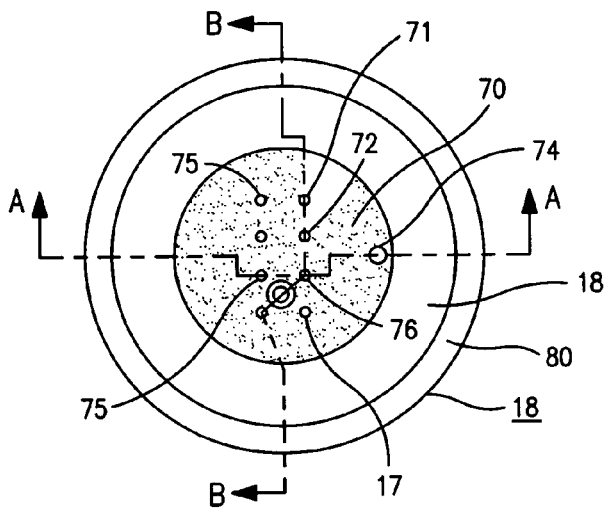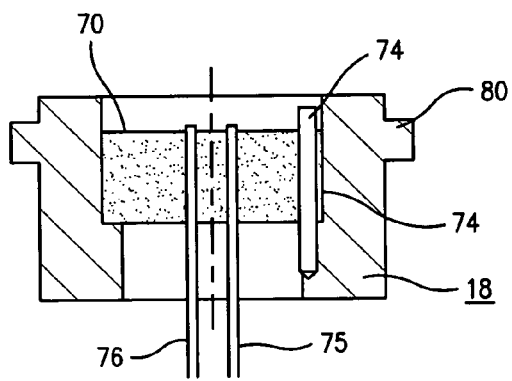
FIG. 2A  FIG. 2B
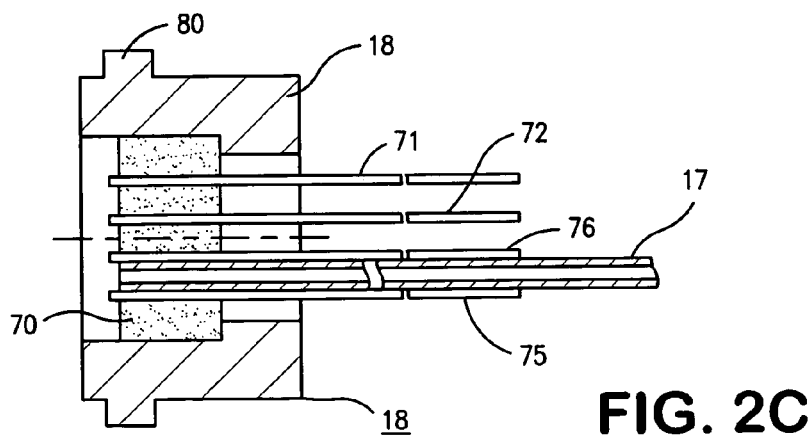
FIG. 2C

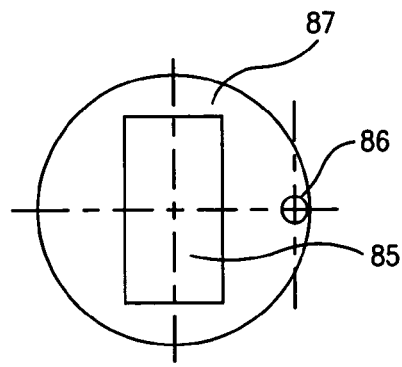 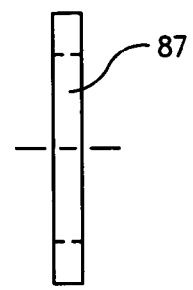
FIG. 3A  FIG. 3B
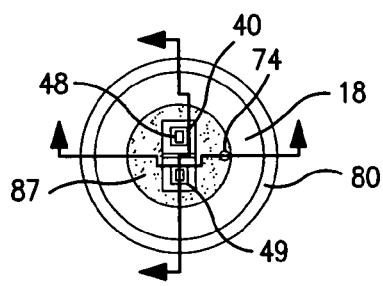
FIG. 4A
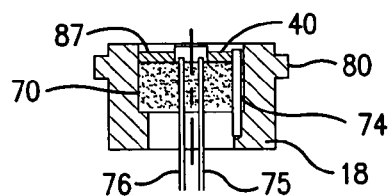
FIG. 4B
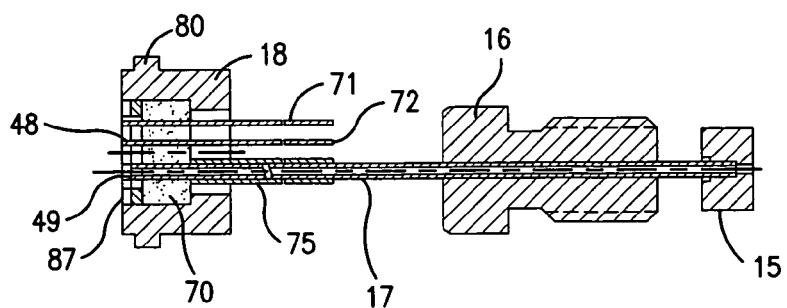
FIG. 5

MOUNTING APPARATUS AND METHOD FOR ACCURATELY POSITIONING AND ALIGNING A LEADLESS SEMICONDUCTOR CHIP ON AN ASSOCIATED HEADER

RELATED APPLICATIONS

This application is a continuation in part of a co-pending application entitled A Compact Absolute and Gage Pressure Transducer filed on Jun. 19, 2008 as Ser. No. 12/214,507.

FIELD OF THE INVENTION

This invention relates to apparatus and a method for mounting a leadless semiconductor chip, having one or more dice or dies, on a header to enable proper placement and alignment of the chip terminals to the header pins.

BACKGROUND OF THE INVENTION

There are numerous examples of pressure transducer structures which employ a chip of silicon having positioned or fabricated thereon one or more semiconductor pressure transducers. Each transducer may have four or more terminals and are of the leadless type. Such a chip is mounted on a header and as such the terminals have to align with the pins or terminals in the header. The alignment and positioning of the chip on the header is difficult as the silicon chip blocks the view of the header pins making alignment and placement of the chip difficult. This problem is further compounded as the chip gets smaller making it even more difficult to be positioned properly and accurately aligned. The need for quick and accurate alignment is required as the piezoresistive transducer or sensor having multiple transducer configurations on a single chip are being extensively employed. The above noted problems are mainly related to those semiconductor chips of the leadless type. These chips, as is known, do not have leads emanating from terminals but have contact areas which are the output terminals and these contact areas have to contact the header pins or header terminals. For devices that have leads attached to the terminals, the leads are connected directly to the header pins. However as one can ascertain, this is much more labor intensive than the method and apparatus described herein. While the invention has particular use with leadless devices it can also be used for placement and alignment of flip chips on associated headers.

SUMMARY OF THE INVENTION

A method of mounting a leadless semiconductor chip on a header, said semiconductor chip having leadless contacts on a surface and having a specified geometric shape, said header having a contact surface for receiving said chip with said contact surface of said header containing header contact pins, which have to contact said semiconductor chip contacts when said chip is accommodated by said header, comprising the steps of: placing a guide pin on said contact surface of said header with said pin extending form said contact surface, forming a guide plate having a chip accommodating aperture of said specified geometric shape and adapted to receive said chip, said guide plate having a guide aperture remote from said chip accommodating aperture and dimensioned to receive said guide pin, placing said guide plate on said contact surface of said header by placing said guide aperture over said guide pin to enable said guide plate to be positioned on said header contact surface, wherein said chip accommodating aperture surrounds said header contact pins, and placing said chip in said chip accommodating aperture whereby said chip contacts make direct contact with said header contact pins.

BRIEF DESCRIPTION OF THE FIGURES

FIG. 1 consists of FIG. 1A, FIG. 1B and FIG. 1C.
FIG. 1A depicts a top view of a leadless semiconductor chip employed with this invention.
FIG. 1B depicts a cross-sectional view of the chip shown in FIG. 1A.
FIG. 1C depicts a bottom view of the chip of FIG. 1A.
FIG. 2 consists of FIG. 2A, FIG. 2B and FIG. 2C.
FIG. 2A depicts a top view of a header employing a glass member according to this invention.
FIG. 2B depicts a view taken through line A-A of FIG. 2A.
FIG. 2C depicts a view of the header taken through line B-B of FIG. 2A.
FIG. 3A depicts a top view of a glass guiding plate according to this invention.
FIG. 3B depicts a side view of the plate of FIG. 3A.
FIG. 4 consists of FIG. 4A and FIG. 4B.
FIG. 4A is a top view of the header of FIG. 3A employing a leadless semiconductor chip.
FIG. 4B is a cross-sectional view taken through line A-A of FIG. 4A.
FIG. 5 is a cross-sectional view depicting the semiconductor chip and header including a reference tube and various components used to fabricate a pressure transducer device.

DETAILED DESCRIPTION OF THE FIGURES

Figure 6:
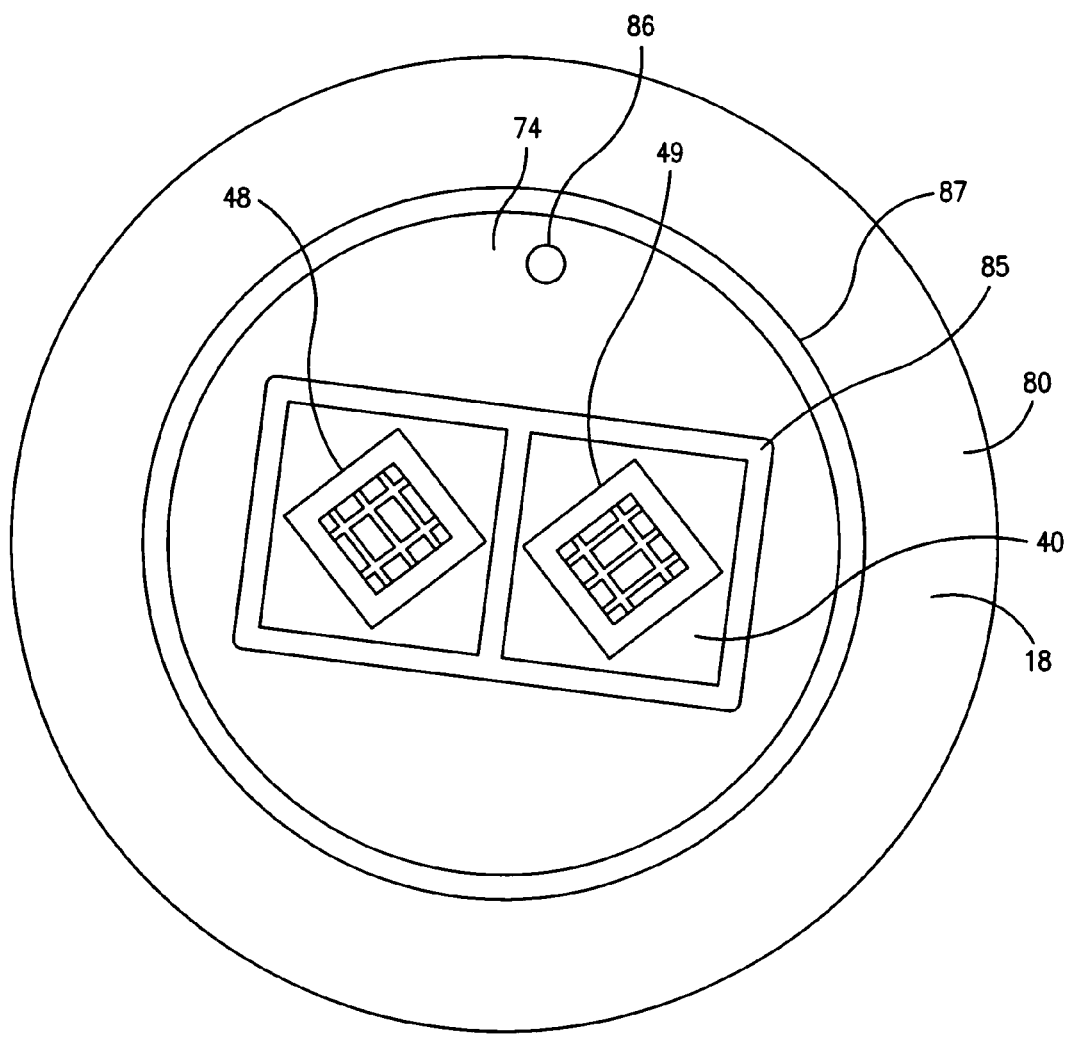
FIG. 6 an enlarged depiction of a semiconductor chip employing two sensor arrangements mounted in a header according to this invention.

Referring to FIG. 1, which consists of FIGS. 1A, 1B and 1C, there is shown an example of a leadless transducer. The term leadless is a term utilized by Kulite Semiconductor Products, the assignee herein. Kulite has many patents related to leadless devices. For example, see U.S. Pat. No. 6,595,066 entitled Stopped Leadless Differential Sensor issued on Jul. 22, 2003 to A. D. Kurtz, et al. and assigned to the assignee herein. That patent shows a leadless device and also in column 1, lines 42 to 56 there is cited additional patents which also show leadless transducers. Thus the leadless device is well known in the prior art, and as indicated many such devices have been patented by the assignee herein. FIG. 1, as will be explained, describes one type of the leadless device which for example, contains two separate sensing dies on a single semiconductor chip. As will be explained, the two devices have multiple terminals. It is also understood, while there are two sensors on the semiconductor chip, basically one or more than two sensors could be applied utilizing the principles of this invention. Thus again referring to FIG. 1, there is shown in FIG. 1A a top view of the sensor assembly and in FIG. 1B a cross-sectional side view of the assembly and in FIG. 1C a bottom view of the assembly. The sensor assembly, as will be explained, is eventually coupled to a die glass and a header glass. The sensors shown in FIG. 1 are essentially similar to the sensors depicted in U.S. Pat. No. 7,057,247 entitled Combined Absolute Differential Transducer. There are certain differences but the sensors depicted in FIG. 1 basically consist of two leadless piezoresistive sensors which are made from the same chip of silicon and are chosen to be adjacent to each other on the silicon chip. Such devices are described in detail in the above noted patent which is incorporated herein in its entirety. While there is no particular function assigned to the two sensors, it is indicated that one of the sensors, for example, sensor 48 can function as an absolute sensor and could contain Wheatstone bridge array as depicted in the above noted patent. Such arrays may be fabricated in accordance with the teachings of U.S. Pat. No. 5,955,771 entitled Sensors for Use in High Vibrational Applications and Methods for Fabricating Same issued on Sep. 21, 1999 to A. D. Kurtz, et al. and assigned to the assignee herein. Thus as shown in FIG. 1A, the two sensors as 48 and 49 are fabricated on the same semiconductor chip 60 in accordance to the teachings of the above noted U.S. Pat. No. 5,955,771 which is incorporated herein in its entirety. By selecting adjacent sensors as 48 and 49, with the same web thickness, both the thermal shift and the thermal sensitivity shift are controlled by the impurity concentrations of the P+ regions and by how well they match other. Thus, the thermal properties of the two individual sensors can be more closely controlled and match each other. This results in better overall devices. The two sensors as 48 and 49 may be used in a single attached body as shown in FIG. 1A and thus mounted in a single operation, although they can also be cut apart and mounted separately. As seen in FIG. 1A, the sensor assembly 40 is rectangular in shape. It has a first and a second aperture as 61 and 62 which communicate with the silicon sensor assemblies 48 and 49. As is more clearly seen in FIG. 1B, the apertures as 61 and 62 allow a pressure to be applied to the top side of the sensors 48 and 49. As seen in FIG. 1B, sandwiched between the cover glass 52 and the contact glass 47 is the silicon wafer 60. The wafer or chip 60 contains the bridge configurations as 48 and 49, which bridge configurations communicate with apertures 61 and 62 from the top surface of the cover glass member 52. As indicated above, bonded to the underside of the silicon chip is a contact glass wafer 47. The contact glass wafer 47 has contact apertures 50, 51, 56 and 57. These contact apertures generally make contact with the contact areas on the respective semiconductor chip. These apertures as 50, 51, 56 and 57 are eventually filled with a conductive glass frit, which is preferably a mixture of metal (Pt, Pd, etc. combination) and glass frit. It is preferred that the glass frit be made with PYROCERAM, a glass material manufactured by Corning Glass Company. The PYROCERAM glass frit is prepared by mixing the finely powered glass and metal with a suitable suspension vehicle such as a mixture of nitrocellane in anylacerate to a desired consistency to form a base like mixture of metal glass frit. Thus, filling these apertures enables one to make contact via the apertures and via the conductive frit to the terminals on the silicon chip 60 associated with the bridge. This is seen in FIG. 1B whereby the apertures communicated directly with the semiconductor chip. In this manner, each of the sensor terminals are directed through corresponding apertures such as 50, 51, 56 and 57 to enable contact to the bridge terminals via the contact apertures. As seen in FIG. 1C there are basically eight such apertures. There is shown an aperture 59 which essentially will accommodate access to a reference pressure tube or a pressure tube for certain semiconductor configurations. It is noted that the mounting technique to be described herein for a semiconductor chip is not particularly applicable to any particular sensor arrangement, but dual sensor chips or multiple sensor chips having absolute, gage or differential as well as other semiconductor devices can be employed and mounted in the header according to the teachings of this invention. It is noted that the above noted structure shown in FIG. 1 is fabricated according to the structures depicted in U.S. Pat. No. 6,612,179 and also fabricated according to the structure shown in U.S. Pat. No. 5,955,771 both of which are incorporated herein. As one will also ascertain, the bonding of the glass layers to the silicon sensor chip is accomplished by the techniques depicted in U.S. Pat. No. 5,286,671 entitled Fusion Bonding Technique for Use in Fabricating Semiconductor Devices issued on Feb. 15, 1994 to A. D. Kurtz, et al. and assigned to Kulite Semiconductor Products, Inc. It is thus seen that the chip as shown is rectangular in shape and basically the rectangular shape is easy to accommodate. It is of course understood that other geometrical configurations can be used as well. It is noted in FIG. 1C again that there is a gage hole 59 associated with the semiconductor chip section 49. As seen, there is no gage hole associated with semiconductor chip 48. Thus the semiconductor chip 48 could function as an absolute sensor while the section 49 functions as the gage or differential sensor. Such configurations are known and are described in the above noted U.S. Pat. No. 7,057,247. Referring to FIGS. 1A and 1B there is also shown an isolation groove 41. The groove 41 is made through the cover glass member 52 and through the semiconductor or silicon chip 60. The groove prevents current flow or coupling between sensor bridges 48 and 49 thus electrically isolating the same. Again, it is understood that while a silicon chip as shown in FIGS. 1A and 1C, the chip having two die sections as 48 and 49 that other chip configurations can be employed with the present invention to expedite proper alignment and mounting of such semiconductor devices on headers, such as flip-chips and so on.

Referring to FIG. 2 there is shown FIGS. 2A, 2B and 2C. FIG. 2A is a top view of the header 18. FIG. 2B is a sectional view taken through line A-A of FIG. 2A while FIG. 2C is a sectional view taken through line B-B of FIG. 2A. As seen in FIG. 2A, the top view of the header 18 is basically circular and has a peripheral flange 80 associated with the metal outer header housing. Positioned in the center of the header is a header glass member 70, the member 70 is clearly shown in FIG. 2B. The header glass 70 has a plurality of pins as 75 and 76 extending from the top surface. In FIG. 2A there is shown pins 71, 72, 75, 76 and 78. These pins are seen in FIG. 2B extending through the glass header and extending slightly above the top of the glass header. Based on the pattern shown in FIG. 2A, when a chip shown in FIG. 1 is placed properly on the header, the conductive contacts of the leadless chips which contacts are associated with apertures 50, 51 and so on, will make direct contact with the terminal pins as 75 and 76 associated with the glass header. As seen, these terminals or pins or header contacts extend out from the glass header 70 and when a chip such as shown in FIG. 1 is placed thereon with the apertures as 50 and 51 filled with a conductive frit, the conductive frit will make direct contact with the extending terminals as 75 and 76. Also shown in FIG. 2A is a Kovar guiding pin 74. As will be explained, the pin 74 accesses an aperture in a glass guide plate to enable the chip always be properly aligned with respect to the terminals of the glass header. FIG. 2C also depicts the reference tube 17 which reference tube, of course, is associated with the sensor 49 (FIG. 1) in order to produce a gage output in certain sensor configurations. FIG. 2C shows a cross-sectional view taken through line B-B of FIG. 2A and essentially shows terminal pins as 71, 72, 75, 76 as well as reference tube 17. It is indicated that the reference tube is just shown for sake of explanation and that the reference tube also has to be properly positioned with respect to the chip so that the corresponding section of the chip will receive a reference pressure when the chip is operated in a dual mode, as for example, as an absolute and differential device. Is noted that the above noted co-pending application, namely Ser. No. 12/214,507 entitled A Compact Absolute and Gage Pressure Transducer depicts a gage and absolute transducer positioned on a semiconductor chip as the chip shown in FIG. 1 which again, is positioned on a header as the same header shown in FIG. 2 with the use of this invention, namely the use of a glass guide plate and a guide pin 74. The co-pending application, as indicated above, relates to the fabrication of a absolute and differential device using this technique and is incorporated herein in its entirety.

Referring now to FIG. 3 and FIG. 4, one can see in FIG. 3A a top view of the glass guiding plate 87. The guiding plate 87 has a central rectangular aperture 85 which conforms to the shape of the rectangular chip. The guiding plate 87 has a guiding hole or aperture 86. The hole 86 co-acts with the pin 74 as shown in FIGS. 2A and 2B, and therefore the guiding plate 87, when positioned over the glass header 70 of FIG. 2B by means of the guiding pins 74 inserted into aperture 86 will enable the chip, when placed in the rectangular aperture 85, to always be in the correct position. Essentially, the guiding plate depicted is made out of glass and is approximately 0.2 inches in diameter with a rectangular opening being 0.143 inches by 0.068 inches. This approximately is the same size as the chip, as the chip fits into the aperture with very close tolerances. Since the contact areas on the chip are larger in area than the diameters or contact areas of the pins of the header, there is always assured that the contact terminals of the chip will make contact with the header pins. As one can see from FIG. 4A, where the same reference numerals have been used, the guiding plate 87 as shown in FIG. 3A is positioned over the glass header 70. The aperture 85 in the glass guiding plate is positioned over the guide pin 74. As seen in the top view of FIG. 4A, the chip containing die sections 48 and 49 is placed in the rectangular aperture and is exactly positioned so that it makes contact with the header contacts. Referring to FIG. 4B, there is shown the glass guiding plate 87 of FIG. 3A positioned over the glass header 70 as contained in the metallic header 18. Thus as shown in FIGS. 4A and 4B, once the glass guiding plate is placed on the glass header 70, it can be bonded to the header to be permanently positioned, then the chip 40 would be placed in the guiding plate chip accommodating aperture 85. To bond the chip to the header and to insure a good bond, one places a thin layer of glass frit such as pyroceram on the header. The layer is thin and does not exceed the height of the header pins as 75 and 76. The glass header 70 is heated before the glass plate is inserted and thus the plate is bonded to the header. With the frit still soft, the chip is inserted and thus bonded to the header via the chip accommodating aperture 85.

FIG. 5 depicts a complete unit containing the chip sections 48 and 49, all of which are easily assembled and as described and are in perfect alignment because of the guiding glass plate 87 which is secured to the header 70. As one can ascertain, bonding between silicon and glass is well known, and as indicated above, the chip is bonded to the glass header for permanent affixation through the rectangular aperture 85. It is also indicated that the rectangle 85 can vary in dimensions and for example, in one embodiment, the rectangular aperture 85 shown in FIG. 3A may be only slightly larger than the width of the chip. In this manner, the silicon would be pushed or forced into the aperture 85, when the glass frit is softened and the chip would be placed so that it is forced or compression fitted into the aperture. The softened glass frit will be pushed up between the aperture and the chip. This fitting of the chip into the aperture 85 will create an extremely tight seal which essentially would be water proof and therefore prevent water from seeping into the header 70 and contaminating the terminal pins 75 and 76. As indicated above, there is a molten glass frit on the header. When the header receives the chip, via the rectangular opening, 85 is only slightly larger than the chip (0.142 inches by 0.066 inches). The chip is pushed into place in this embodiment and because of the force fit, the molten glass frit flows into the space between the chip and the plate creating a peripheral seal.

Referring to FIG. 6 there is shown an enlarged view of the sensor assembly depicting the guiding pin 74 inserted into aperture 86. The semiconductor chip 40 is positioned with an aperture 85 associated with the guiding glass plate 87. Thus, as one will ascertain from the above noted description, there is a described a method or apparatus for mounting a semiconductor chip on a header by the use of a guiding glass plate, which plate may be bonded to the glass header and which plate and guiding pin facilitates chip insertion and assures proper alignment in a rapid and efficient manner, this saves a considerable amount of fabrication time which otherwise would have to be employed. The device because of the use of the leadless devices enables a compact device to be provided. The leadless device eliminates terminal leads but merely employs contacts. It is noted that while a dual die sensor device on a single chip is depicted, that one can utilize a single device and fabricate it so that it is larger in dimensions to fit into the aperture 85 of the guiding plate and therefore to enable quick and rapid contact to the terminal pins of the header as described above. It is again noted that co-pending application Ser. No. 12/214,507 entitled A Compact Absolute and Gage Pressure Transducer filed on Jun. 19, 2008 describes the above-noted technique in fabricating a compact absolute and differential transducer. Again the application is incorporated herein in its entirety and is cited to show how useful semiconductor devices can be implemented using the above-noted technique and therefore providing extremely rapid mounting and enabling a compact design because of the positive assurance the device when placed in the aperture of the guiding plate will always be properly aligned with respect to the pins. Thus one skilled in the art upon reading the above noted specification will consider many alternate embodiments all of which are deemed to be encompassed within the spirit and scope of the claims appended hereto.

What is claimed is:

1. A method of mounting a leadless semiconductor chip on a header, said semiconductor chip having leadless contacts on a surface and having a specified geometric shape, said header having a contact surface for receiving said semiconductor chip with said contact surface of said header containing header contact pins, which have to contact said semiconductor chip contacts when said chip is accommodated by said header, comprising the steps of:

placing a guide pin on said contact surface of said header with said guide pin extending from said contact surface;

forming a guide plate having a chip accommodating aperture of said specified geometric shape and adapted to receive said semiconductor chip, said guide plate having a guide aperture remote from said chip accommodating aperture and dimensioned to receive said guide pin;

placing said guide plate on said contact surface of said header by placing said guide aperture over said guide pin to enable said guide plate to be positioned on said header contact surface, wherein said chip accommodating aperture surrounds said header contact pins; and placing said chip in said chip accommodating aperture whereby said chip contacts make direct contact with said header contact pins.

2. The method according to claim 1 wherein said geometric shape is rectangular.

3. The method according to claim 2 wherein said chip accommodating aperture is slightly larger than said semiconductor chip.

4. The method according to claim 2 wherein said chip accommodating aperture is dimensioned to enable said semiconductor chip to be force fitted into said chip accommodating aperture to create a tighter seal with glass frit forced up the side between the aperture and the semiconductor chip.

5. The method according to claim 1 wherein said contact surface of said header is the surface of a cylindrical header glass member having contact pins directed from a bottom surface of said cylinder to a top contact surface, said header pins extending from said top contact surface and relatively parallel to said guide pin.

6. The method according to claim 5 wherein said guide plate is fabricated from glass.

7. The method according to claim 6 wherein said guide plate is bonded to said contact surface of said header glass member.

8. The method according to claim 1 wherein said semiconductor chip is a pressure sensor chip and is bonded to said header by a glass frit.

9. The method according to claim 8 wherein said semiconductor chip is a silicon chip.

10. Apparatus for positioning a leadless semiconductor chip of a given geometric configuration on a header, comprising:
a header having a cylindrical body formed from an insulating material, said header having a header contact surface including a plurality of header terminal pins adopted to electrically contact terminals placed on said header surface and positioned according to said location of said header terminal pins, and
a guide plate having a chip accommodating aperture of said given geometric configuration and for containing said semiconductor chip, said guide plate having a guide aperture positioned over a guide pin extending from said header contact surface when said guide plate is positioned on said header contact surface where said chip accommodating aperture encircles said header terminal pins, whereby when said semiconductor chip is placed in said chip accommodating aperture said semiconductor chip contacts contact said header terminal pins.

11. The apparatus according to claim 10 wherein said insulating material of said header is glass.

12. The apparatus according to claim 11 wherein said guide plate is glass.

13. The apparatus according to claim 12 wherein said guide plate is bonded to said header at said contact surface.

14. The apparatus according to claim 10 wherein said semiconductor chip is a pressure sensor chip.

15. The apparatus according to claim 14 wherein said semiconductor chip is a silicon chip.

16. The apparatus according to claim 10 wherein said given geometric shape is a rectangle.

17. The apparatus according to claim 16 wherein said chip accommodating aperture is slightly larger than said rectangle.

18. The apparatus according to claim 16 wherein said chip accommodating aperture is dimensioned to enable a force fit to be provided when said semiconductor chip is inserted into said accommodating aperture.

19. The apparatus according to claim 10 wherein said guide pin is fabricated from Kovar.

20. The apparatus according to claim 10 wherein said semiconductor chip contains piezoresistive elements positioned thereon.

* * * * *